(12) United States Patent
Tochigi (10) Patent No.: US 6,290,085 B1
(45) Date of Patent: Sep. 18, 2001

(54) PARTITIONED CLOSED CONTAINER, ITS PRODUCTION METHOD AND PRESSURE CONTAINER

(75) Inventor: Masaharu Tochigi, Tochigi (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/257,792

(22) Filed: Feb. 25, 1999

(51) Int. Cl.⁷ .................................................. B65D 1/24
(52) U.S. Cl. .................. 220/507; 220/553; 220/612; 220/678; 219/121.63; 228/184
(58) Field of Search .................. 219/121.63, 121.64; 220/581, 4.12, 500, 612, 678–680, 507, 553; 228/112.1, 184

(56) References Cited

U.S. PATENT DOCUMENTS

| | | | |
|---|---|---|---|
| 3,729,812 | * | 5/1973 | Thomas ................................ 228/155 |
| 3,824,368 | * | 7/1974 | Locke .............................. 219/121.64 |
| 3,860,784 | * | 1/1975 | Brown et al. .................... 219/121.64 |
| 3,949,186 | * | 4/1976 | Nakayama et al. ............. 219/121.64 |
| 4,461,946 | * | 7/1984 | Kratschmer ...................... 219/121.63 |
| 4,879,801 | * | 11/1989 | Stubbe et al. ........................ 29/455.1 |
| 4,905,858 | * | 3/1990 | Budenbender ....................... 220/612 |
| 5,100,014 | * | 3/1992 | Shiozawa ............................. 220/256 |
| 5,451,742 | * | 9/1995 | Nishio et al. .................... 219/121.64 |
| 5,697,511 | * | 12/1997 | Bampton ............................. 220/4.12 |
| 5,813,592 | * | 9/1998 | Midling et al. ................... 228/112.1 |
| 6,051,325 | * | 4/2000 | Talwar et al. ........................ 428/593 |
| 6,053,391 | * | 4/2000 | Heideman et al. .................... 228/2.1 |

* cited by examiner

Primary Examiner—Samuel M. Heinrich (57) ABSTRACT

An inventive partitioned closed container comprises a cylindrical main body, a partition provided within said main body in a body therewith along the longitudinal direction thereof and lids for closing openings of the main body. The lids are joined with the main body and the partition by means of frictional agitating joining or laser welding. Thereby, it is possible to realize a good joining condition and to assure reliability in terms of strength without increasing the weight and the cost.

3 Claims, 9 Drawing Sheets

PARTITIONED CLOSED CONTAINER, ITS PRODUCTION METHOD AND PRESSURE CONTAINER

BACKGROUND OF THE INVENTION

1. Field of the Invention

The present invention relates to a metallic partitioned closed container suited as various storage cases for storing hydrogen storage alloy and the like or as various pressure containers such as a tank mounted on a tank lorry and to a manufacturing method thereof and a pressure container.

It is noted that the term "aluminum" is used in the meaning of containing its alloy in this specification.

2. Description of the Related Art

A conventional partitioned closed container comprising a cylindrical main body, a partition provided within the main body in a body therewith in the longitudinal direction and lids for closing openings of the main body has been sealed up by joining the lids with the main body from the outer peripheral surface by means of TIG welding or MIG welding after attaching the lids to the openings of the main body.

However, the partitioned closed container thus obtained has had the following problems. That is, it has had a problem that when it is fabricated by the TIG or MIG welding, its content is affected by heat because the high temperature heat is generated during the welding and that cracks occur at the welded section due to thermal stress by receiving rapid heating and cooling thermal cycles. Further, because the lids have been joined only with the main body in the above-mentioned partitioned closed container, the joining strength of the lids is low and the container is uncertain in terms of its strength. When a thick or high strength and highly rigid lid is used to assure the reliability of the lid in terms of its strength on the other hand, there arises a problem that the weight and the cost of the container increase.

Meanwhile, a conventional partitioned closed container comprising a cylindrical main body, a partition provided within the main body traversely so as to part the main body in the longitudinal direction and lids for closing openings of the main body has had problems that because it is sealed up by the TIG or MIG welding in the same manner with that described above, its content is affected during the welding or cracks occur at the welded section.

Further, it has been cumbersome to fabricate the two partitioned closed containers described above because the joining works have to be carried out from the inside of the main body in joining the partition to the inner peripheral surface of the main body by the TIG or MIG welding. When the container is small, it has been difficult even to insert a welding apparatus to the inside of the main body.

The invention has been devised in view of those problems and its object is to provide a partitioned closed container which is joined well and can assure the reliability in terms of strength without increasing the weight and the cost.

Another object of the invention is to provide a method for manufacturing a partitioned closed container which allows to prevent its content from being affected by heat generated during joining.

SUMMARY OF THE INVENTION

In order to achieve the above-mentioned objects, an inventive partitioned closed container comprises a cylindrical main body, a partition provided within the main body in a body therewith along the longitudinal direction thereof and lids for closing openings of the main body and is characterized in that the lids are joined with the main body and the partition by means of frictional agitating joining or laser welding.

Because the lids are joined with the main body and the partition, the joining strength of the lids is high and the reliability of the lids in terms of strength is high. Accordingly, because it is not necessary to use a thick or a high strength and highly rigid lid as the lids, it is possible to prevent the weight and the cost from increasing.

Further, according to the invention, frictional agitating joining or laser welding is employed as joining means for joining the lids with the main body and the partition.

In joining the lids with the main body and the partition by means of the frictional agitating joining, a probe provided in a joining tool for frictional agitating joining is inserted to the outer surface of the lid from the outside of the main body while rotating the probe. The insertion is carried out by penetrating through the lid by the edge of the probe by softening the lid by frictional heat and by inserting to the end surface of the main body and the partition until when the end surface of the main body and the partition is softened. Then, the probe is moved relatively to the main body and the partition along the end surface of the main body and the partition in this state. Thereby, the lids may be joined with the main body and the partition.

In joining the lids with the main body and the partition by means of laser welding, a laser beam is irradiated to the outer surface of the lid from the outside of the main body. The laser beam is irradiated to the end surface of the main body and the partition by penetrating through the lid while melting the lid until when the end surface of the main body and the partition melts. Then, the beam is moved relatively to the main body and the partition along the end surface of the main body and the partition in this state.

Accordingly, the manufacturing work may be facilitated because the joining works may be carried out from the outside of the main body in joining the lids with the main body and the partition by using the frictional agitating joining or the laser welding as joining means for joining the lids with the main body and the partition.

It is preferable to use a slab laser whose resonator section is slab as a source of heat of the laser welding. A gas slab laser whose laser medium is gas or a solid slab laser whose laser medium is solid may be cited as such slab laser. Because such slab laser allows high output laser to be generated, the use of the slab laser allows the welding rate to be increased and the efficiency of the joining work to be improved. Further, because it allows very deep penetration to be obtained as compared to the laser welding, the MIG welding and TIG welding using a rod laser whose resonator section is rod-like as a source of heat, the lids may be joined firmly with the main body and the partition and as a result, the tightness may be enhanced.

It is especially desirable to employ the frictional agitating joining between the frictional agitating joining and the laser welding as joining means by the following reasons. That is, because the frictional agitating joining is one of solid-phase joining, it causes no crack at the joined section, which otherwise occurs by thermal stress by receiving rapid heating and cooling thermal cycles like the case of fusion welding such as MIG and MIG welding, and realizes the good joining state. Further, because the frictional agitating joining causes less heat during joining, it allows to prevent the content from being affected by heat generated during the joining even when the content is stored within the closed container.

Another inventive partitioned closed container comprises a cylindrical main body, a partition provided within the main body so as to part it along the longitudinal direction thereof and lids for closing openings of the main body and is characterized in that the partition is joined to the main body by means of frictional agitating joining or laser welding and the lids are joined with the main body by means of frictional agitating joining or laser welding.

Because the partition is joined with the main body and the lids are joined with the main body, the reliability of the whole container in terms of strength becomes is enhanced.

Still more, the use of the frictional agitating joining or the laser welding as the joining means for joining the partition with the main body and as the joining means for joining the lids with the main body allows the manufacturing works to be facilitated because both of the joining operation for joining the partition with the main body and the joining operation for joining the lids with the main body may be carried out from the outside of the main body.

The above and other related objects and features of the invention will be apparent from a reading of the following description of the disclosure found in the accompanying drawings and the novelty thereof pointed out in the appended claims.

DETAILED DESCRIPTION OF THE EMBODIMENTS OF THE INVENTION

Preferred embodiments of the invention will be explained below with reference to the drawings.

Figure 1:
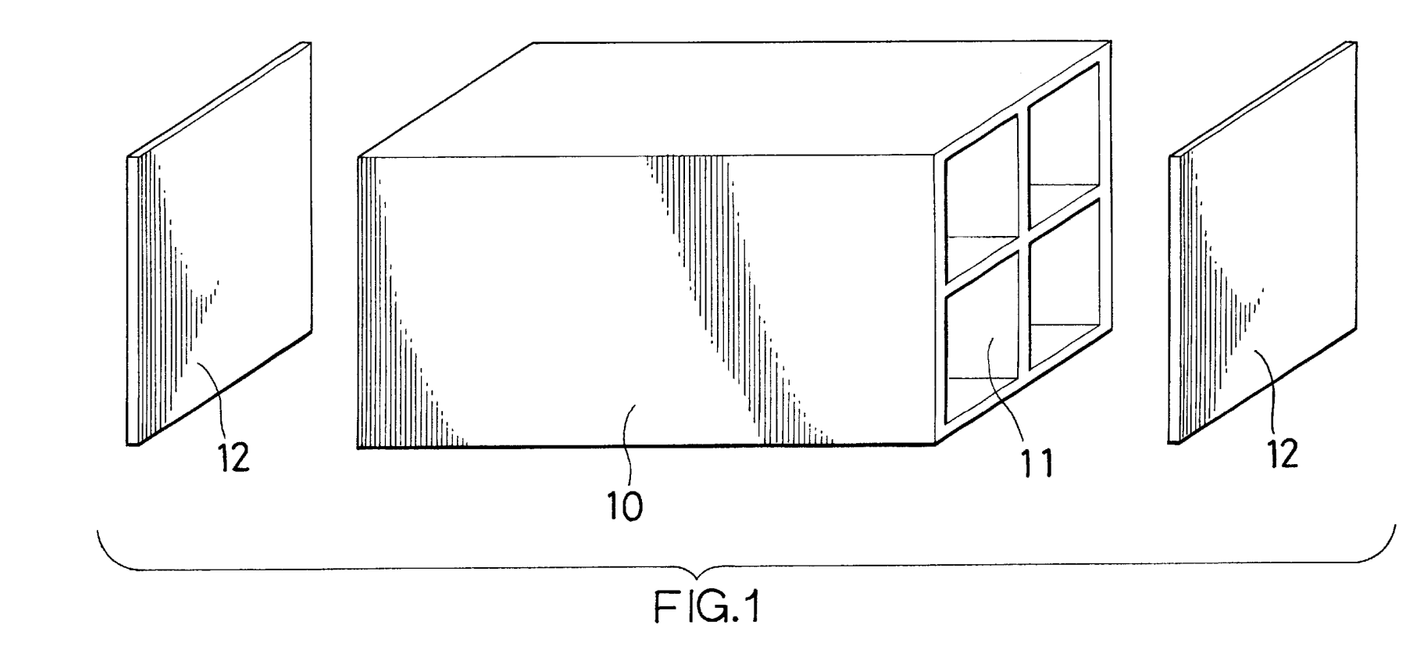
FIG. 1 is a perspective view showing the state before joining lids with a main body and a partition according to a first embodiment of the invention.
Figure 2A:
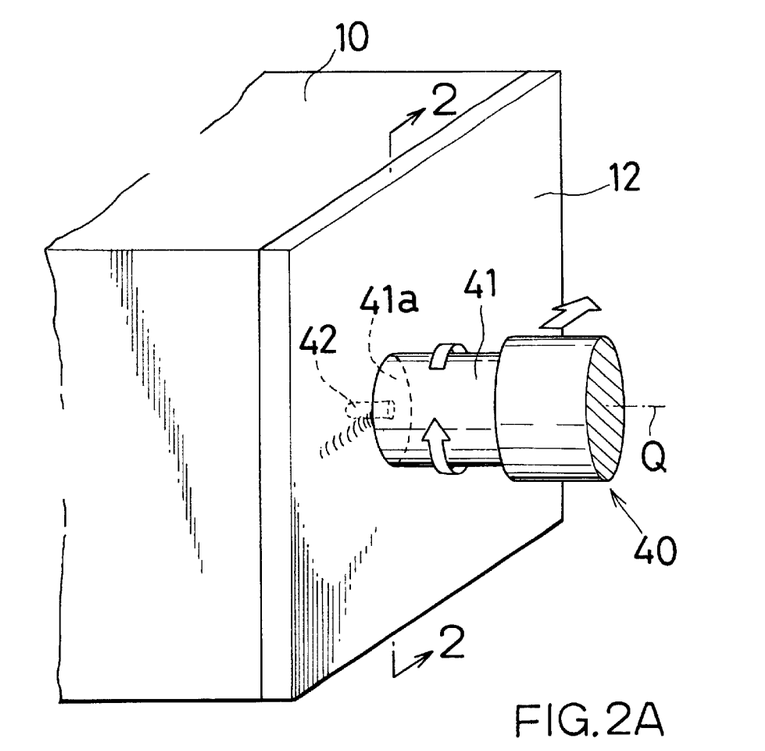
FIG. 2A is a perspective view showing the state in which the lid is on the way of being joined with the main body and the partition and FIG. 2B is a section view along a line 2–2 in FIG. 2A.
Figure 2B:
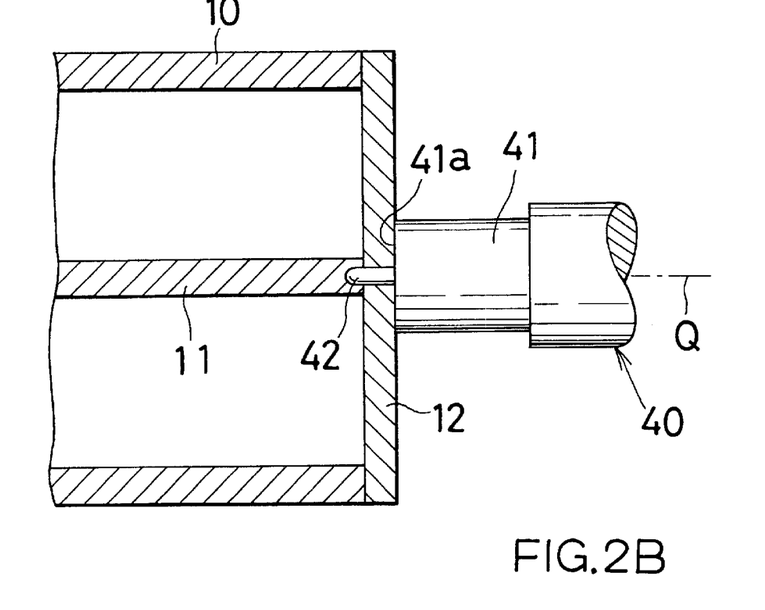
Figure 3:
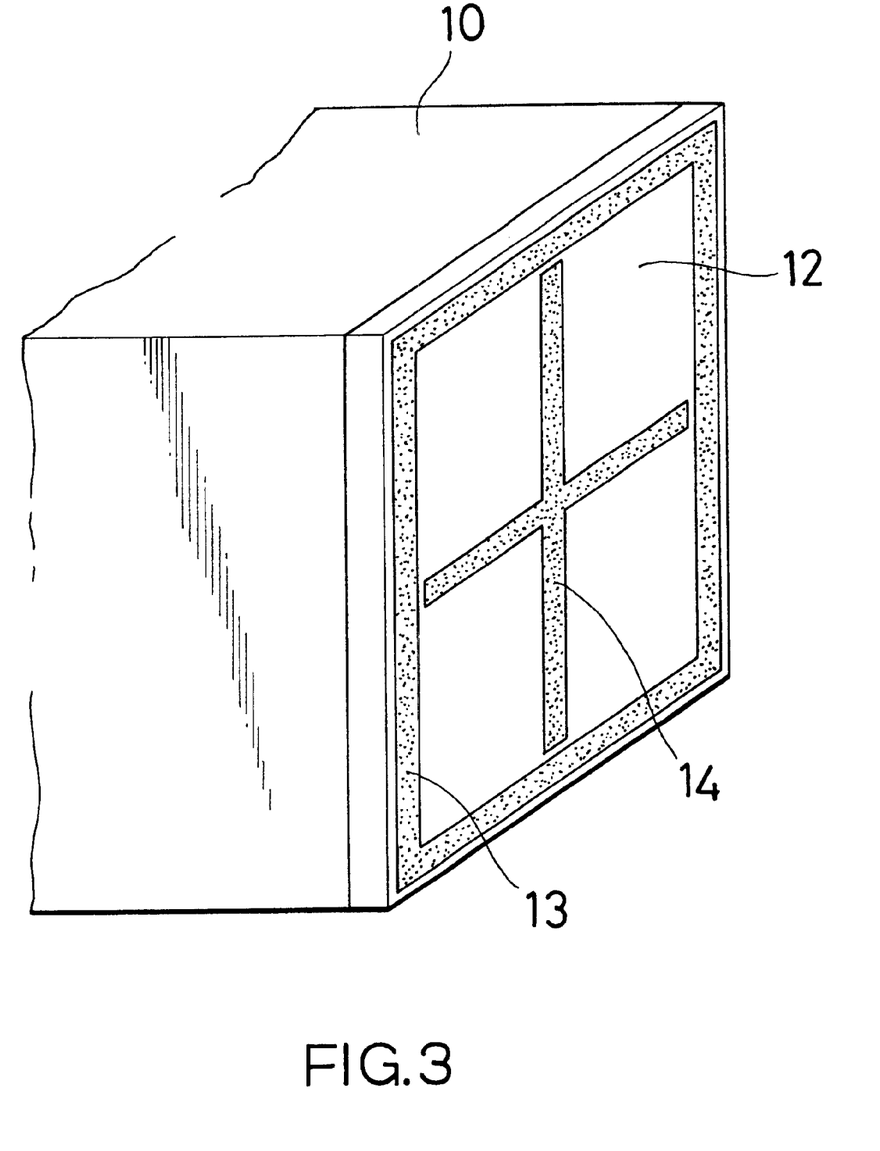
FIG. 3 is a perspective view showing the state in which the lid has been joined with the main body and the partition.
Figure 4:
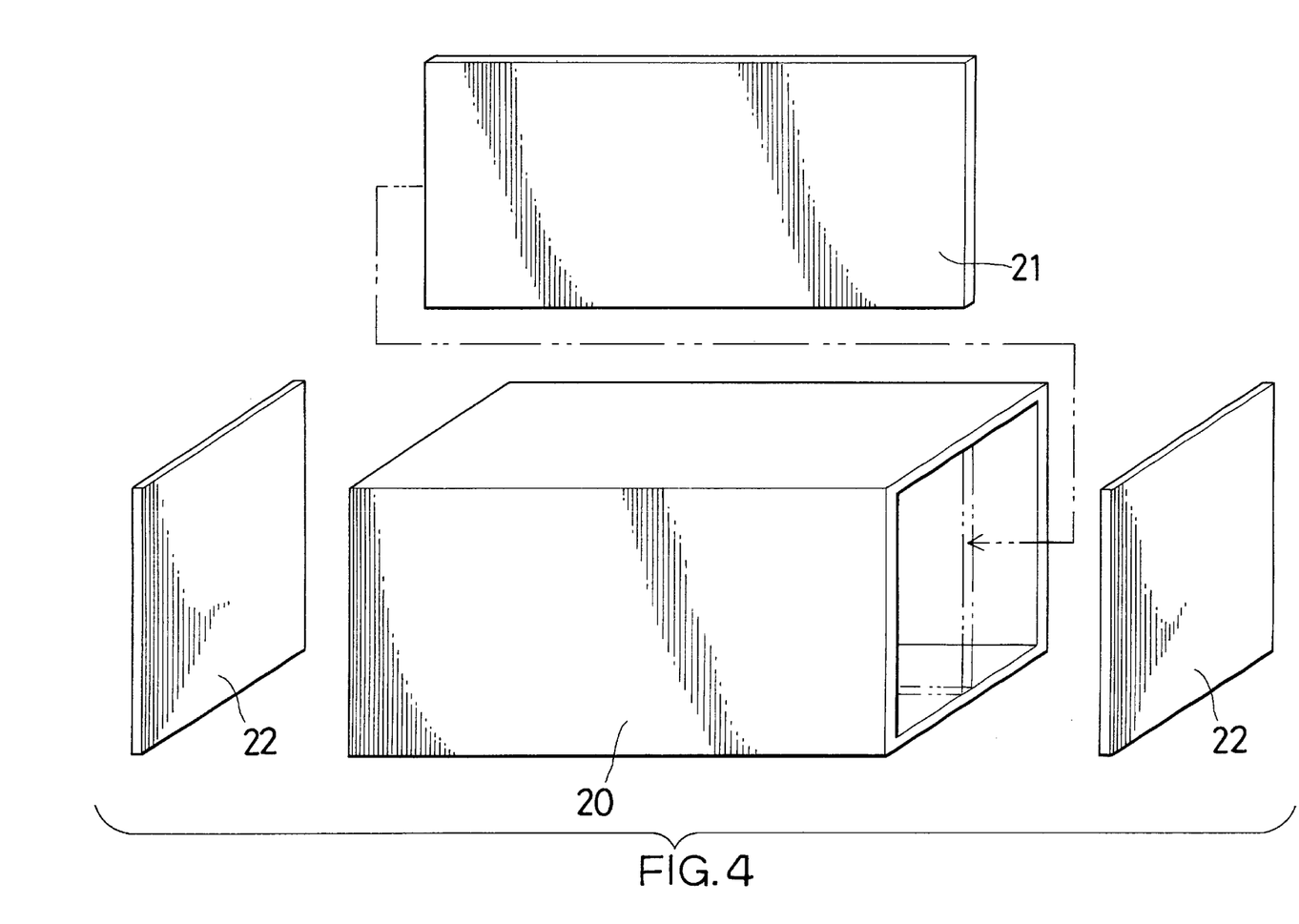
FIG. 4 is a perspective view showing the state before lids are joined with a main body and a partition according to a second embodiment of the invention.
Figure 5:
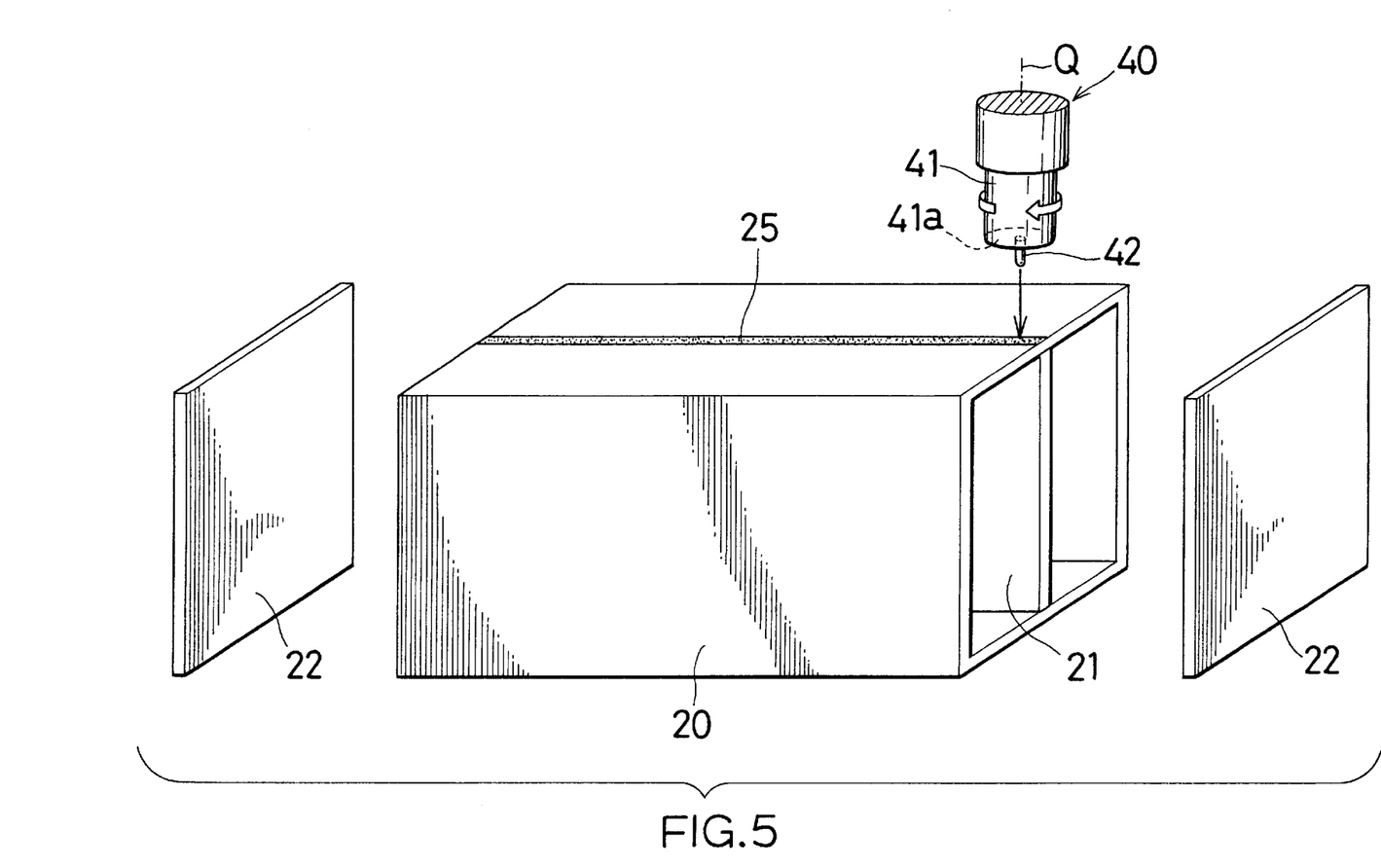
FIG. 5 is a perspective view showing the state in which the partition is joined with the main body.
Figure 6:
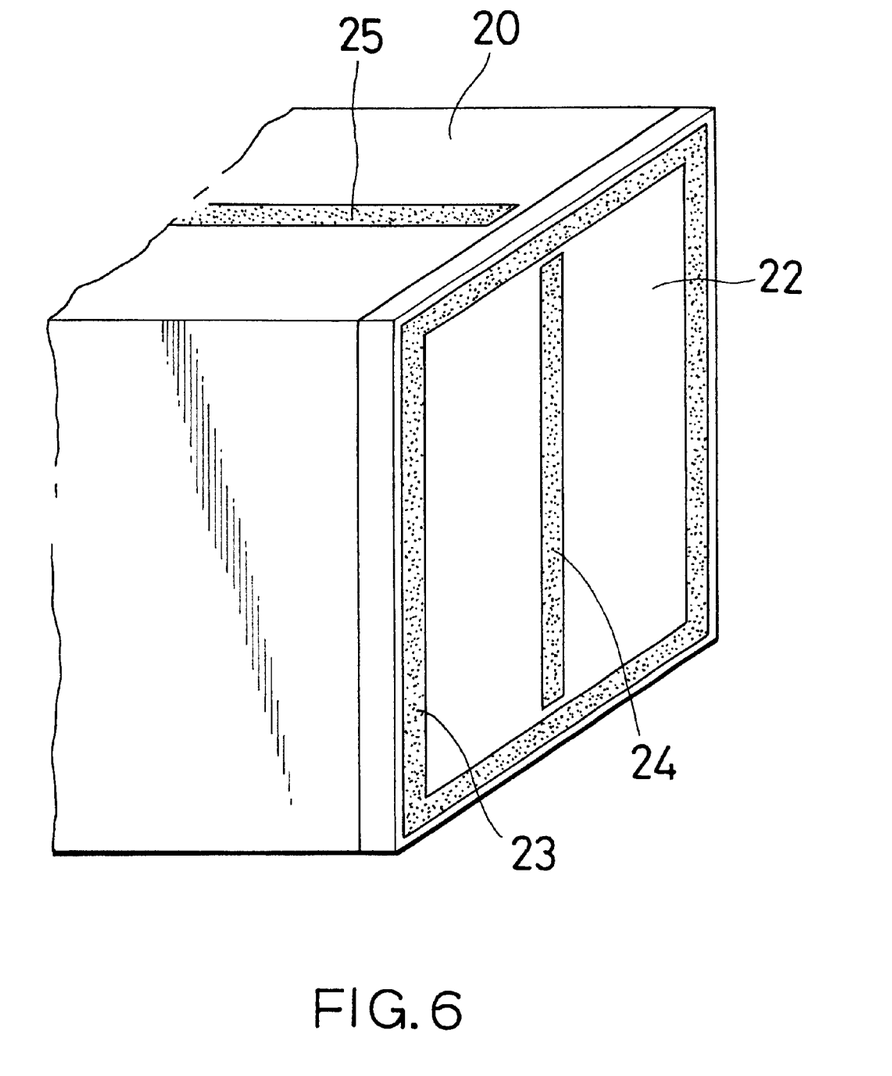
FIG. 6 is a perspective view showing the state in which the partition has been joined with the main body and the partition.
Figure 7:
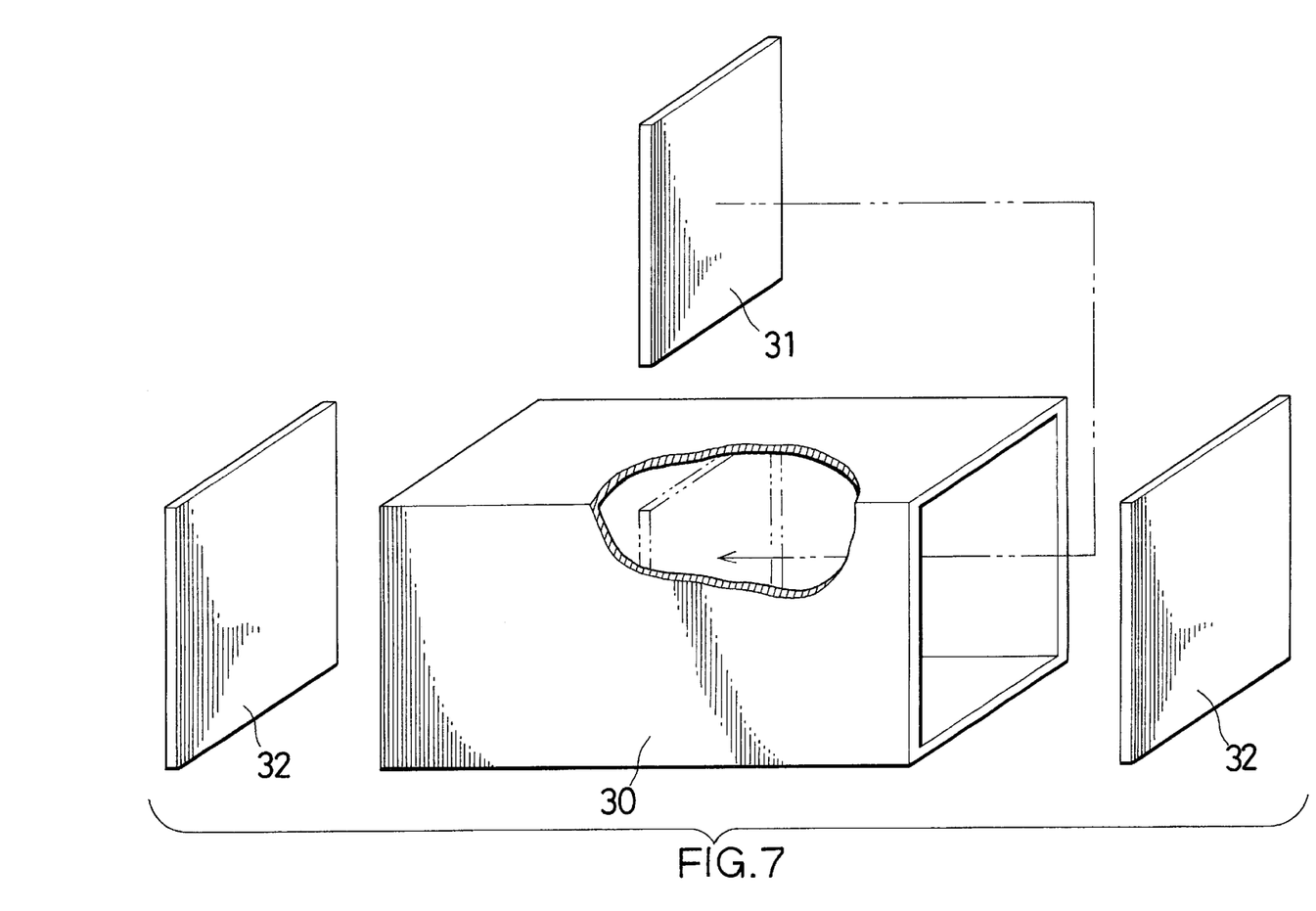
FIG. 7 is a partially cutaway perspective view showing the state before lids and a main body are joined with a partition according to a third embodiment of the invention.
Figure 8:
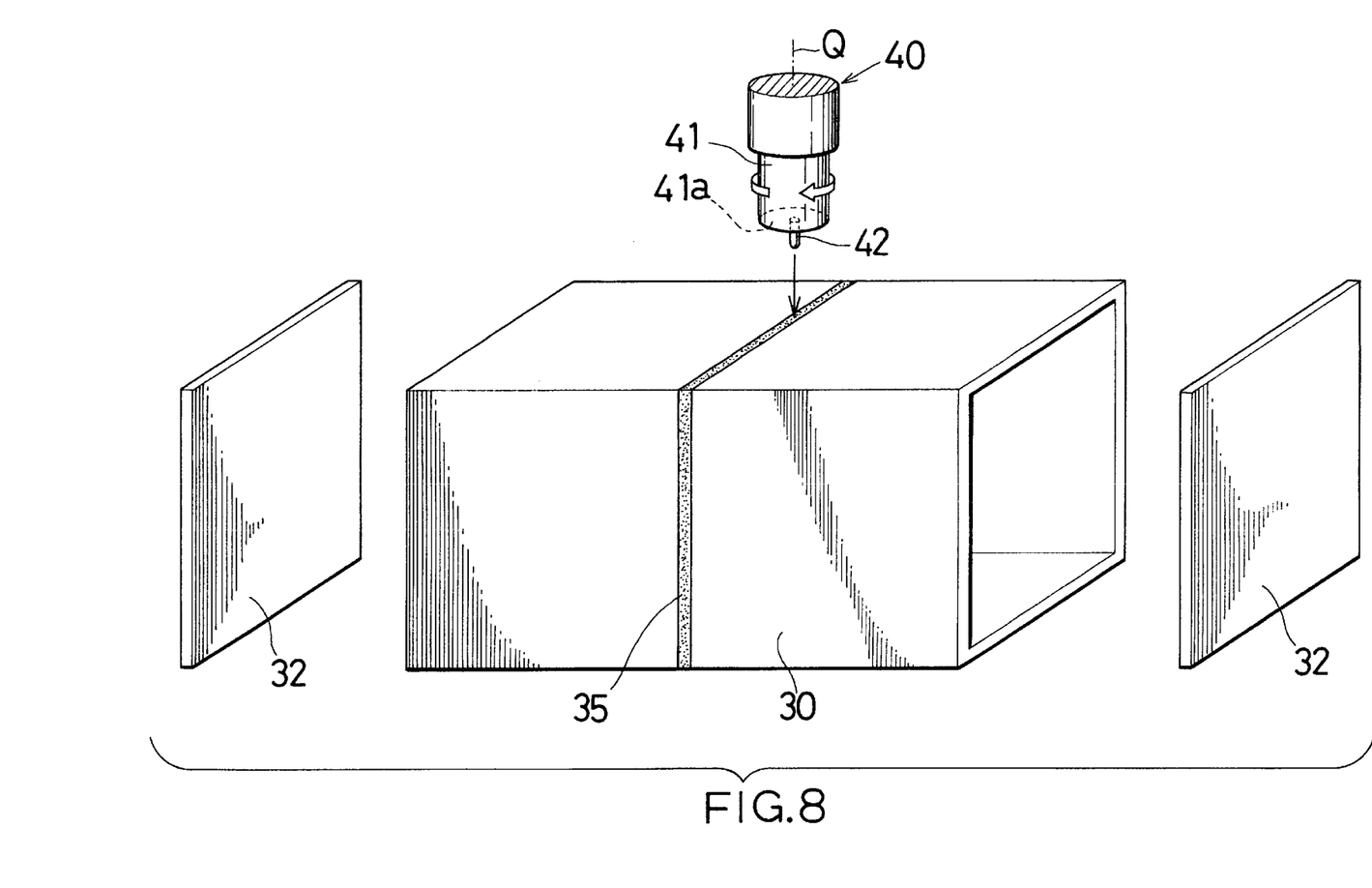
FIG. 8 is a perspective view showing the state in which the partition has been joined with the main body.
Figure 9:
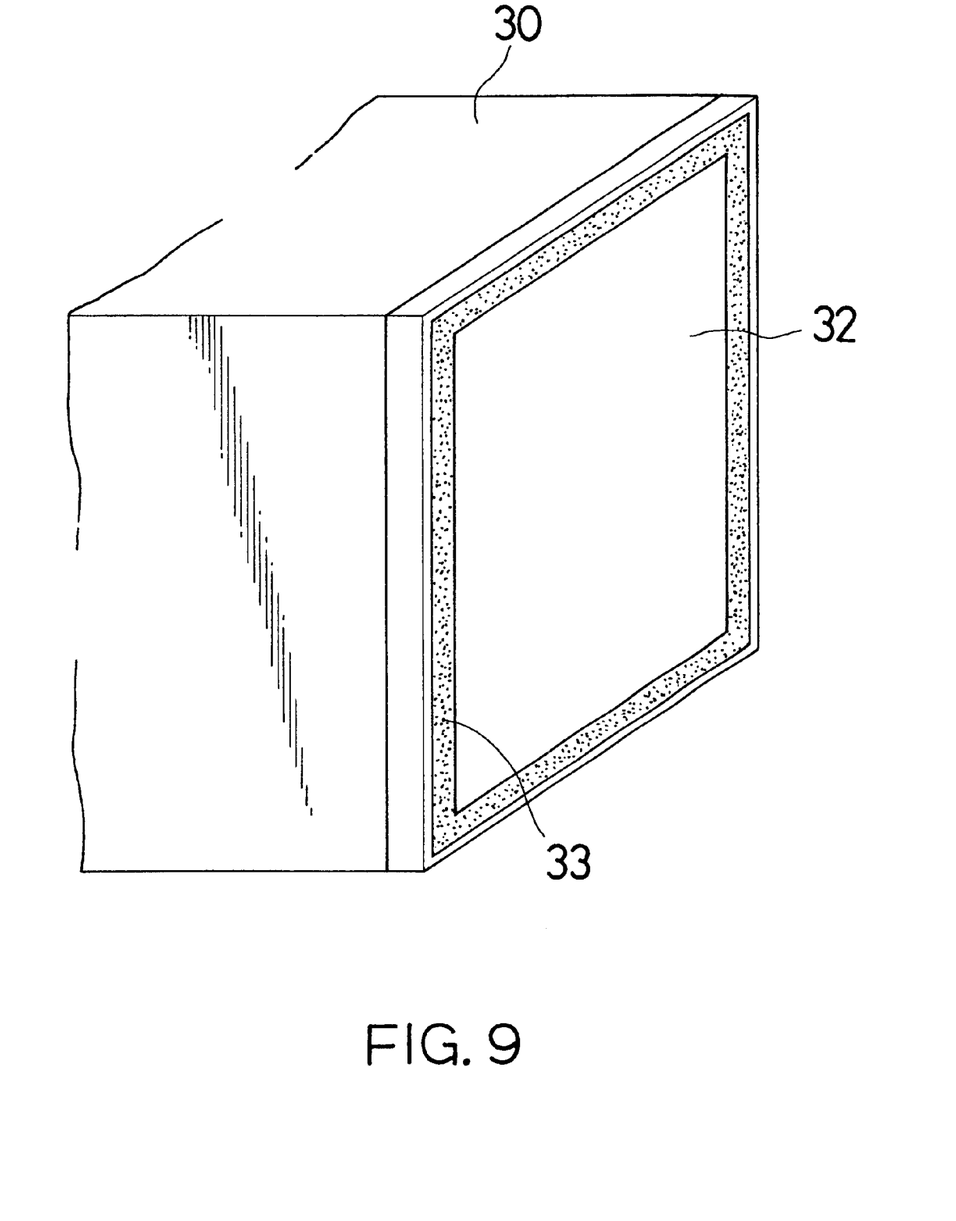
FIG. 9 is a partial perspective view showing the state in which the lid has been joined with the main body.

FIGS. 1 through 3 show a first embodiment of the invention, FIGS. 4 through 6 show a second embodiment of the invention and FIGS. 7 through 9 show a third embodiment of the invention. It is assumed that each joining is implemented by means of frictional agitating joining in these three embodiments.

The first embodiment of the invention shown in FIGS. 1 through 3 will be explained at first.

In these figures, the reference numeral 10 denotes a main body of a closed container. The main body 10 is formed into a rectangular cylindrical shape as shown in FIG. 1. A partition 11 having a transverse section in a shape of a cross is provided within the main body 10 in a body with the main body 10 along the longitudinal direction. The main body 10 and the partition 11 are manufactured in a body by aluminum extruded members.

The reference numeral 12 denotes a square thin-plate lid made from aluminum for closing openings created at the both ends of the main body 10.

The partitioned closed container of the present embodiment will be explained below in alignment with a manufacturing method thereof.

At first, the lids 12 are attached to the both ends of the main body 10 to close the openings of the main body 10. Then, the lids 12 are joined with the main body 10 and the partition 11 from the outside of the main body 10 by means of frictional agitating joining.

This frictional agitating joining will be explained below.

FIGS. 2A and 2B show a joining tool 40 for the frictional agitating joining. The joining tool 40 comprises a cylindrical rotator 41 having a large diameter and a pin-like probe 42 having a small diameter provided in a body with the rotator so as to project from an end surface 41a on an axial line Q thereof. The rotator 41 and the probe 42 are formed of a heat resistant material which is harder than the lids 12, the main body 10 and the partition 11 and which is capable of sustaining to generated frictional heat.

The joining tool 40 is used to insert the probe 42 to the outer surface of the lid 12 while rotating the probe 42 by rotating the rotator 42 at high speed. The insertion is carried out until when the probe 42 penetrates through the lid 12 and the edge thereof is inserted to the main body 10 or the partition 11 and until when the end surface 41a of the rotator 41 abuts with the lid 12. Then, while inserting the probe, the joining tool 40 is moved relatively to the main body 10 and the partition 11 along the end surface of the main body 10 or the partition 11 while floating a part of the end surface 41a of the rotator 41 on the side of the advancing direction by slightly inclining the tool in the direction opposite from the advancing direction. Then, frictional heat generated by the rotation of the probe 42 or frictional heat generated when the end surface 41a of the rotator 41 slides with the outer surface of the lid 12 softens the nearby part contacting with the probe 42 and the softened part is agitated by the rotation of the probe 42. By receiving pressure of the advancement of the probe 42 as the probe 42 moves, the softened and agitated part is fluidized plastically in a manner of turning around to the rear part of the advancing direction of the probe 42 so as to catch a groove of the passing prove. It then looses the frictional heat rapidly and is cooled and solidified. This phenomenon is repeated one after another as the probe 42 moves and finally, the lid 12 is joined in a body with the main body 10 and the partition 11. The reference numeral 13 in FIG. 3 denotes the part where the lid 12 is joined with the main body 10 and 14 the part where the lid 12 is joined with the partition 11. The both are formed continuously.

Thus, because the frictional agitating joining for joining them by contacting the rotating probe 42 with the region to be joined is solid phase joining, it has various merits such that it is not limited by the material of the lid 12, the main body 10 and the partition 11, it causes less heat during joining, it causes less deformation due to thermal strain and it causes no crack at the joined sections 13 and 14.

The partitioned closed container of the present embodiment may be obtained by joining the lid 12 with the main body 10 and the partition 11 as described above.

Because the lid 12 is joined with the main body 10 and the partition 11 in this partitioned closed container, the reliability on the strength of the lid 12 is high. Further, because all of the main body 10, the partition 11 and the lid 12 are made from aluminum, the container is light.

Still more, the frictional agitating joining allows the partitioned closed container to be manufactured readily because the lids 12 may be joined with the main body 10 and the partition 11 from the outside of the main body 10 as shown in the present embodiment.

Next, a second embodiment of the invention shown in FIGS. 4 through 6 will be explained.

In these figures, the reference numeral 20 denotes a main body of a closed container. The main body 20 is formed into a rectangular cylindrical shape by an aluminum extruded member as shown in FIG. 4. The reference numeral 21 denotes a plate-like aluminum partition provided within the main body 20 along the longitudinal direction, and 22 a square thin aluminum lid 22 for closing openings created at the both ends of the main body 20.

The partitioned closed container of the present embodiment will be explained below in alignment with a manufacturing method thereof.

At first, the partition 21 is disposed within the main body 20 by inserting therein. Then, the partition 21 is joined with the inner surface of the main body 20 from the outside of the main body 20 by means of frictional agitating joining by using the joining tool 40 for frictional agitating joining as shown in FIG. 5.

This frictional agitating joining is carried out almost in the same manner and procedure with those described in the above-mentioned embodiment. This will be explained below briefly. The probe 42 is inserted from the outer surface of the lid 22 while rotating the probe 42 by rotating the rotator 41 of the joining tool 40. The insertion is carried out until when the probe 42 penetrates through the main body 20 and the edge thereof is inserted to the partition 21 and until when the end surface 41a of the rotator 41 abuts with the main body 20. Then, while inserting the probe 42, the prove 42 is moved relatively along the end surface of the partition 21 in the width direction. Thus, the partition 21 is joined in a body with the main body 20 at the both end surfaces thereof in the width direction. The reference numeral 25 in FIG. 5 denotes a section where the partition 21 is joined with the main body 20.

Next, the lids 22 are attached to the both end surfaces of the main body 20 to close the openings of the main body 20. Then, the lids 22 are joined with the main body 20 and the partition 21 by means of frictional agitating joining from the outside of the main body 20. The reference numeral 23 in FIG. 6 is the section where the lid 22 is joined with the main body 20 and 24 the section where the lid 22 is joined with the partition 21. The frictional agitating joining is carried out in the same manner and procedure with those in the above-mentioned embodiment and hence, its explanation will be omitted here.

The partitioned closed container of the present embodiment may be obtained by joining the lid 22 with the main body 20 and the partition 21 as described above.

Because the lid 22 is joined with the main body 20 and the partition 21 in this partitioned closed container, the reliability on the strength of the lid 22 is high.

Further, the frictional agitating joining allows the partitioned closed container to be manufactured readily because the partition 21 may be joined with the main body 20 and the lids 22 may be joined with the main body 20 and the partition 21 from the outside of the main body 20 even when the main body 20 and the partition 21 are manufactured separately as shown in the present embodiment.

Thus, because the lids 12 and 22 are joined with the main bodies 10 and 20 and the partitions 11 and 21 in the partitioned closed containers of the first and second embodiments, the reliability on the strength of the lids 12 and 22 is high. Accordingly, the partitioned closed containers in the first and second embodiments described above may be suitably used as a pressure container which receives pressure from the inside such as a tank mounted on a tank lorry.

Next, a third embodiment of the invention shown in FIGS. 7 through 9 will be explained.

In these figures, the reference numeral 30 denotes a main body of a closed container. The main body 30 is formed into a rectangular cylindrical shape by an aluminum extruded member as shown in FIG. 7. The reference numeral 31 denotes a plate-like aluminum partition which is provided within the main body 30 so as to traverse the main body 30 to part it in the longitudinal direction and 32, 32 square thin aluminum lids 22 for closing openings created at the both ends of the main body 30.

The partitioned closed container of the present embodiment will be explained below in alignment with a manufacturing method thereof.

At first, the partition 31 is disposed within the main body 30 by inserting therein. Then, the partition 31 is joined with the inner peripheral surface of the main body 30 from the outside of the main body 30 by means of frictional agitating join as shown in FIG. 8. The reference numeral 35 shown in FIG. 8 is the section where the partition 31 is joined with the main body 30. This frictional agitating joining is carried out almost in the same manner and procedure with those described in the above-mentioned embodiment and hence, its explanation will be omitted here.

Next, the lids 32 are attached to the both end surfaces of the main body 30 to close the openings of the main body 30. Then, the lids 32 are joined with the main body 30 by means of frictional agitating joining from the outside of the main body 30. The reference numeral 33 in FIG. 9 is the section where the lid 32 is joined with the main body 30. The frictional agitating joining is carried out in the same manner and procedure with those in the above-mentioned embodiment and hence, its explanation will be omitted here.

The partitioned closed container of the present embodiment may be obtained by joining the lids 32 with the main body 30 as described above.

Because the partition 31 is joined with the main body 30 and the lids 32 are joined with the main body 30 in this partitioned closed container, the reliability on the strength of the whole container is high.

Further, the frictional agitating joining allows the partitioned closed container to be manufactured readily because the partition 31 may be joined with the main body 30 and the lids 32 may be joined with the main body 30 from the outside of the main body 30 even when the main body 30 and the partition 31 are manufactured separately as illustrated in the present embodiment.

Thus, because the joining is carried out by means of the frictional agitating joining in the three embodiments described above, it is possible to prevent the content from being affected by heat generated during joining. Accordingly, the frictional agitating joining allows the joining to be carried out while storing the content (not shown) within the main body 10, 20 or 30.

While the three embodiments of the invention have been explained above, the invention is not confined to these embodiments. For instance, although the main bodies 10, 20 and 30 have been the rectangular cylindrical members whose both ends are opened in the three embodiment described above, it may be a rectangular or circular cylindrical member which has a bottom and whose only one end is opened.

It is noted that it is possible to store the content from a storage port (not shown) after joining the lids 12, 22 or 32 by means of frictional agitating joining when the storage port is provided on a peripheral surface of the main body 10, 20 or 30 or on the lids 12, 22 or 32 like a tank mounted on a tank lorry.

It is also needless to say that each joining may be carried out by means of laser welding. Concrete Examples:

In order to manufacture the closed container of the embodiment shown in FIG. 1, the main body and the partition were manufactured in a body by an aluminum extruded member and the lids (thickness 2 mm) were manufactured by an aluminum member. The material of aluminum used here were both JIS 6N01.

Then, the lids were joined with the main body and the partition by laser welding by using a $CO_2$ slab laser whose medium is $CO_2$ and whose resonant section, i.e., discharge space, is slab as a source of heat. The mode of oscillation of the $CO_2$ slab laser during the joining was continuous oscillation (CW oscillation) and the joining was carried out by continuously forming a welding section by moving a laser beam continuously while irradiating the laser beam to the outer surface of the lid from the outside of the main body. Samples Nos. 1 through 4 are the partitioned closed containers thus manufactured.

Here, as the $CO_2$ slab laser, an RF discharge excited laser was used. It is constructed so as to obtain a laser output by setting a plate-like space between a pair of parallel plate-like exciting electrodes, i.e., a slab space, as a discharge space, by filling $CO_2$ (laser gas) in the slab discharge space and by exciting $CO_2$ in the slab discharge space to oscillate laser by applying high frequency voltage to the electrodes.

The lids were joined with the main body and the partition by laser welding by using an Nd-YAG rod laser whose laser medium is Nd-YAG and whose resonator section is rod-like as a source of heat. The mode of oscillation of the Nd-YAG laser during the joining was continuous oscillation similarly to the case of the $CO_2$ slab laser and the joining was carried out by continuously forming a welding section by moving a laser beam continuously while irradiating the laser beam to the outer surface of the lid from the outside of the main body. Samples Nos. 5 through 6 are the partitioned closed containers thus manufactured.

An aspect ratio of the welded section of the samples Nos. 1 through 6 thus obtained was checked. Table 1 shows its result together with the other welding conditions. It is noted that the aspect ratio of the welded section indicatesa value obtained by dividing a depth of penetration of welded metal by a width of bead of the welding.

TABLE 1

| Sample | Heat Source of Laser | Output (W) | Welding Rate (m/min.) | Flow Rate of Assist Gas (litter/min) | Aspect Ratio of Welded Section |
|---|---|---|---|---|---|
| No. 1 | $CO_2$ Slab Laser | 2000 | 25 | 30 | 1.0 |
| No. 2 | $CO_2$ Slab Laser | 2000 | 20 | 30 | 1.2 |
| No. 3 | $CO_2$ Slab Laser | 2000 | 18 | 30 | 1.5 |
| No. 4 | $CO_2$ Slab Laser | 2000 | 10 | 30 | 3.0 |
| No. 5 | Nd-YAG Rod Laser | 2000 | 4 | 30 | 0.5 |
| No. 6 | Nd-YAG Rod Laser | 2000 | 2 | 30 | 0.8 |

As shown in Table 1, the welded section in which the aspect ratio is 0.8 was formed when the welding rate was 2 m/min. and the welded section in which the aspect ratio was 0.5 was formed when the welding rate was increased to 4 m/min. in manufacturing Sample Nos. 5 and 6. Meanwhile, the welded section in which the aspect ratio is 3.0 was formed when the welding rate was 10 m/min. and the welding section in which the aspect ratio was 1.0 was formed when the welding rate was increased to 25 m/min. in manufacturing Samples Nos. 1 through 4. Accordingly, it was found that the lids may be joined more firmly with the main body and the partition, the joining work may be carried out quickly and the manufacturing efficiency may be improved further by joining by the laser welding using the $CO_2$ slab laser as the source of heat.

It was also checked whether or not liquid leaks out of the closed container by filling the liquid within the closed container and by applying pressure (5 $kg/cm^2$) to the liquid to evaluate the liquid-tightness of Sample Nos. 1 through 6. Similarly to that, it was checked whether or not gas leaks out of the closed container by filling the gas within the closed container and by applying pressure (5 $kg/cm^2$) to the gas to evaluate the air-tightness thereof. As a result, it was found that their liquid- and air-tightness of all of Sample Nos. 1 through 6 were good. Specifically, it was found that the liquid- and air-tightness of Sample Nos. 1 through 4 were far better than those of Sample Nos. 5 and 6, i.e., that they have higher tightness.

As described above, the invention can provide the partitioned closed container having the lids whose reliability is high in terms of strength because the lids are joined with the main body and the partition. Accordingly, it is not necessary to use a thick or high strength and highly rigid lid purposely as the lids and hence, it is possible to prevent the weight and the cost from increasing.

Further, because the invention employs the frictional agitating joining or the laser welding as the joining means for joining the lids with the main body and the partition, it brings about the effect that the joining works can be carried out from the outside of the main body, thus simplifying the manufacturing works.

Still more, the invention brings about the effect that the joining works can be carried out while storing the content within the main body by employing the frictional agitating joining because no crack occurs at the joined section by thermal stress, which otherwise occurs by receiving rapid heating and cooling thermal cycles like the case of fused welding such as MIG and MIG welding, the good joining condition may be realized and it is possible to prevent the content from being affected by heat generated during joining.

Moreover, the invention brings about the effect that the efficiency of the joining works may be improved by employing the slab laser because the welding rate may be increased. Still more, because the depth of penetration is deep, the invention can provide the partitioned closed container whose tightness is high and in which the lids are joined strongly in a body with the main body and the partition, i.e., which has the high rigidity.

It is to be understood that the terms and descriptions used in this specification are used only for the purpose of explaining the embodiment of the invention and are not limited thereto. Also it is to be understood that the various changes in the design of the invention may be made without departing from the spirit and scope thereof.

What is claimed is:

1. A partitioned closed container, comprising:

a cylindrical main body;

a partition provided within said main body along the longitudinal direction thereof, said partition being integrally provided to said main body; and flat plate shaped lids for closing openings of said main body, wherein each of said lids is arranged so that a peripheral end-portion of one side in the thickness direction of said lid is in contact with an end-face of said main body wherein said peripheral end-portion is joined to said main body by means of frictional agitating joining or slab laser welding carried out from the outside of said lid in the thickness direction of the lid, and wherein a longitudinal or widthwise middle portion of each of said lids is joined to said partition by means of frictional agitating joining or slab laser welding carried out from the outside of said lid in the thickness direction of the lid to form a joined portion crossing said lid.

2. A partitioned closed container, comprising:

a cylindrical main body;

a partition provided within said main body so as to part said main body in the longitudinal direction; and flat plate shaped lids for closing openings of said main body;

wherein each of said lids is arranged so that a peripheral end-portion of one side in the thickness direction of said lid is in contact with an end-face of said main body, wherein said partition is joined to said main body by means of frictional agitating joining or slab laser welding, and wherein each of said lids is joined to said main body by means of frictional agitating joining or laser welding carried out from the outside of said lid in the thickness direction of the lid.

3. A pressure container which receives pressure from the inside thereof, said pressure container, comprising:

a cylindrical main body;

a partition provided within said main body; and flat plate shaped lids for closing openings of said main body, wherein each of said lids is arranged so that a peripheral end-portion of one side in the thickness direction of each lid is in contact with an end-face of said main body;

wherein said peripheral end-portion is joined to said main body by means of frictional agitating joining or slab laser welding carried out from the outside of said lid in the thickness direction of the lid, and wherein a longitudinal or widthwise middle portion of each of said lids is joined to said partition by means of friction agitating joining or slab laser welding carried out from the outside of said lid in the thickness direction of the lid to form a joined portion crossing said lid.

* * * * *